US012663944B2

(12) United States Patent
Lee et al.

(10) Patent No.: US 12,663,944 B2
(45) Date of Patent: Jun. 23, 2026

(54) METHOD AND NON-TRANSITORY COMPUTER-READABLE STORAGE MEDIUM AND APPARATUS FOR CONTROLLING EXECUTIONS OF INPUT-OUTPUT COMMANDS

(71) Applicant: Silicon Motion, Inc., Zhubei City (TW)

(72) Inventors: Ting-Chu Lee, Zhubei City (TW); Cheng-Yu Tsai, Kaohsiung City (TW)

(73) Assignee: SILICON MOTION, INC., Zhubei City (TW)

( * ) Notice: Subject to any disclaimer, the term of this patent is extended or adjusted under 35 U.S.C. 154(b) by 0 days.

(21) Appl. No.: 18/894,564

(22) Filed: Sep. 24, 2024

(65) Prior Publication Data

US 2025/0306803 A1      Oct. 2, 2025

(30) Foreign Application Priority Data

Apr. 1, 2024    (CN) .......................... 202410384228.9

(51) Int. Cl.
G06F 3/06 (2006.01)

(52) U.S. Cl.
CPC .......... G06F 3/0659 (2013.01); G06F 3/0619 (2013.01); G06F 3/0679 (2013.01)

(58) Field of Classification Search
CPC ..... G06F 3/0659; G06F 3/0619; G06F 3/0679
See application file for complete search history.

(56) References Cited

U.S. PATENT DOCUMENTS

| | | | | |
|---|---|---|---|---|
| 2012/0331207 A1* | 12/2012 | Lassa | .................... | G06F 1/3278 |
| | | | | 711/E12.008 |
| 2016/0117105 A1* | 4/2016 | Thangaraj | ............. | G06F 3/0604 |
| | | | | 711/103 |
| 2018/0260152 A1 | 9/2018 | Bar et al. | | |
| 2020/0057581 A1 | 2/2020 | Choi | | |
| 2021/0303432 A1 | 9/2021 | Chang et al. | | |

FOREIGN PATENT DOCUMENTS

| | | |
|---|---|---|
| CN | 110088721 A | 8/2019 |
| TW | 202137219 A | 10/2021 |

* cited by examiner

*Primary Examiner* — Eric Cardwell

(74) *Attorney, Agent, or Firm* — Birch, Stewart, Kolasch & Birch, LLP

(57) ABSTRACT

The invention introduces a method for controlling executions of input-output (I/O) commands, performed by a processing unit, which includes: obtaining a current temperature of a device side; fetching I/O commands from a command queue during a fetching time period, and executing the I/O commands to read user data from the flash module, and/or program user data into the flash module in response to the current temperature of the device side exceeding a threshold; calculating a length of an actual execution time period for the I/O commands, and calculating a length of a pause time period according to the length of the actual execution time period after the I/O commands are executed completely; and not fetching and executing any I/O command in the command queue during the pause time period.

20 Claims, 4 Drawing Sheets

METHOD AND NON-TRANSITORY COMPUTER-READABLE STORAGE MEDIUM AND APPARATUS FOR CONTROLLING EXECUTIONS OF INPUT-OUTPUT COMMANDS

CROSS-REFERENCE TO RELATED APPLICATIONS

This application claims the benefit of priority to patent application No. 202410384228.9, filed in China on Apr. 1, 2024; the entirety of which is incorporated herein by reference for all purposes.

BACKGROUND

The disclosure generally relates to storage devices and, more particularly, to a method, a non-transitory computer-readable storage medium and an apparatus for controlling executions of input-output (I/O) commands.

Flash memory devices typically include NOR flash devices and NAND flash devices. NOR flash devices are random access—a host side accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the host side has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word.

However, the temperature of the flash device would rise with the intensive executions of I/O commands, such as host read commands, host write commands, device read commands, device write commands, etc., and unexpected errors occur during data programming and/or data reading, or even worse, the flash device malfunctions because the temperature of the flash device goes too high.

SUMMARY

In an aspect of the invention, an embodiment introduces a method for controlling executions of input-output (I/O) commands, performed by a processing unit, to include the following steps: obtaining a current temperature of a device side; fetching I/O commands from a command queue during a fetching time period, and executing the I/O commands to read user data from the flash module, and/or program user data into the flash module in response to the current temperature of the device side exceeding a threshold; calculating a length of an actual execution time period for the I/O commands, and calculating a length of a pause time period according to the length of the actual execution time period after the I/O commands are executed completely; and not fetching and executing any I/O command in the command queue during the pause time period. The device side includes the flash controller and the flash module. The flash controller is coupled to the flash module and includes the processing unit.

In another aspect of the invention, an embodiment introduces a non-transitory computer-readable storage medium having stored therein program code that, when loaded and executed by a processing unit, causes the processing unit to perform the method for controlling executions of I/O commands, as described above.

In still another aspect of the invention, an embodiment introduces an apparatus for controlling executions of I/O commands, to include: a flash interface (I/F), coupled to a flash module; and a processing unit, coupled to the flash I/F. The processing unit is arranged operably to: obtain a current temperature of a device side; fetch I/O commands from a command queue during a fetching time period, and execute the I/O commands to read user data from the flash module, and/or program user data into the flash module through the flash I/F in response to the current temperature of the device side exceeding a threshold; calculate a length of an actual execution time period for the I/O commands, and calculate a length of a pause time period according to the length of the actual execution time period after the I/O commands are executed completely; and not fetch and execute any I/O command in the command queue during the pause time period. The device side includes the flash controller and the flash module. The flash controller is coupled to the flash module and includes the processing unit and the flash I/F.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Certain aspects and embodiments of this disclosure are provided below. Some of these embodiments may be applied independently and some of them may be applied in conjunction as would be apparent to those of skill in the art. In the following description, for the purposes of explanation, specific details are set forth in order to provide a thorough understanding of aspects of the application. However, it will be apparent that various embodiments may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that changes may be made in the function and arrangement of elements without departing from the spirit and scope of the application as set forth in the claims.

Figure 1:
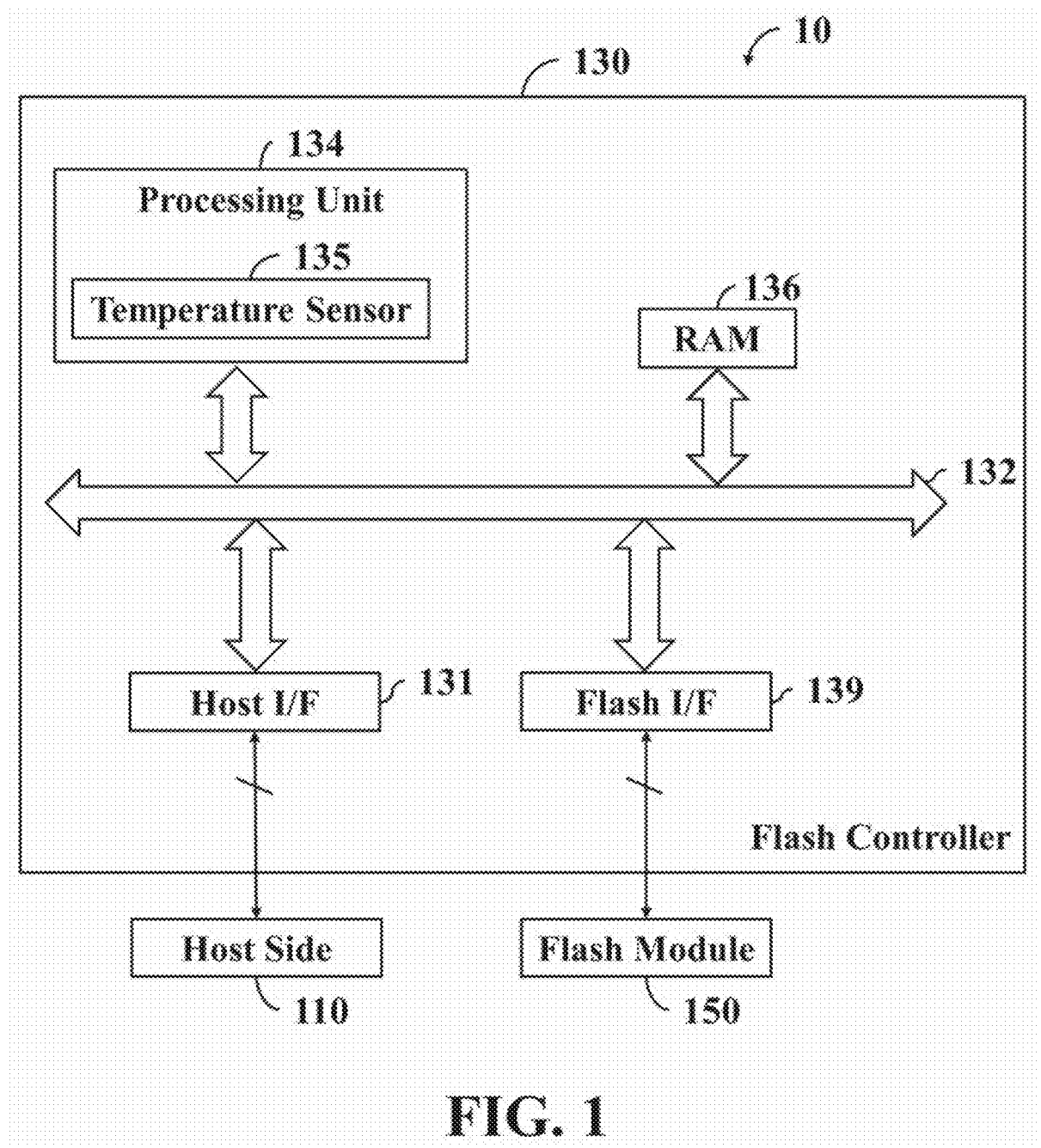
FIG. 1 is the system architecture of an electronic apparatus according to an embodiment of the present invention.

Refer to FIG. 1. The electronic apparatus 10 includes the host side 110, the flash controller 130 and the flash module

150, and the flash controller 130 and the flash module 150 may be collectively referred to as a device side. The electronic apparatus 10 may be equipped with an external storage drive, a Personal Computer (PC), a laptop PC, a tablet PC, a mobile phone, a digital camera, a digital recorder, a smart television, a smart freezer, an automotive electronics system or other consumer electronic products. The host side 110 and the host interface (I/F) 131 of the flash controller 130 may communicate with each other by Universal Serial Bus (USB), Advanced Technology Attachment (ATA), Serial Advanced Technology Attachment (SATA), Peripheral Component Interconnect Express (PCI-E), Universal Flash Storage (UFS), Embedded Multi-Media Card (eMMC) protocol, or others. The flash I/F 139 of the flash controller 130 and the flash module 150 may communicate with each other by a Double Data Rate (DDR) protocol, such as Open NAND Flash Interface (ONFI), DDR Toggle, or others. The flash controller 130 includes the processing unit 134 and the processing unit 134 may be implemented in numerous ways, such as with general-purpose hardware (e.g., a microcontroller unit, a single processor, multiple processors or graphics processing units capable of parallel computations, or others) that is programmed using firmware and/or software instructions to perform the functions recited herein. The processing unit 134 may receive host input-output (I/O) commands from the host side 110 through the host interface (I/F) 131, such as write commands, read commands, etc., schedule and execute the host I/O commands. The flash controller 130 includes the Random Access Memory (RAM) 136, which may be implemented in a Dynamic Random Access Memory (DRAM), a Static Random Access Memory (SRAM), or the combination thereof, for allocating space as a data buffer storing user data (also referred to as host data) that has been obtained from the host side 110 and is to be programmed into the flash module 150, and that has been read from the flash module 150 and is to be output to the host side 110. The RAM 136 stores necessary data in execution, such as variables, data tables, data abstracts, a host-address to flash-address mapping (H2F) table, flash-address to host-address mapping (F2H) tables, or others. The flash I/F 139 includes a NAND flash controller (NFC) to provide functions that are required to access the flash module 150, such as a command sequencer, a Low Density Parity Check (LDPC) encoder/decoder, etc.

The flash controller 130 may be equipped with the bus architecture 132 to couple components to each other to transmit data, addresses, control signals, etc. The components include but not limited to the host I/F 131, the processing unit 134, the RAM 136 and the flash I/F 139. A direct memory access (DMA) circuitry of a component moves data between specific components through the bus architecture 132 according to instructions or control signals. For example, a DMA circuitry of the host I/F 131 or the flash I/F 139 may migrate data in a specific data buffer thereof to a specific address of the RAM 136, migrate data in a specific address of the RAM 136 to a specific data buffer thereof, and so on.

The flash module 150 provides huge storage space typically in hundred Gigabytes (GBs), or even several Terabytes (TBs), for storing a wide range of user data, such as high-resolution images, video files, etc. The flash module 150 includes control circuitries and memory arrays containing memory cells, such as being configured as Single Level Cells (SLCs), Multi-Level Cells (MLCs), Triple Level Cells (TLCs), Quad-Level Cells (QLCs), or any combinations thereof. The processing unit 134 programs user data into a designated address (a destination address) of the flash module 150 and reads user data from a designated address (a source address) thereof through the flash I/F 139. The flash I/F 139 may use several electronic signals including a data line, a clock signal line and control signal lines for coordinating the command, address and data transfer between the flash controller 130 and the flash module 150. The data line may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc.

Figure 2:
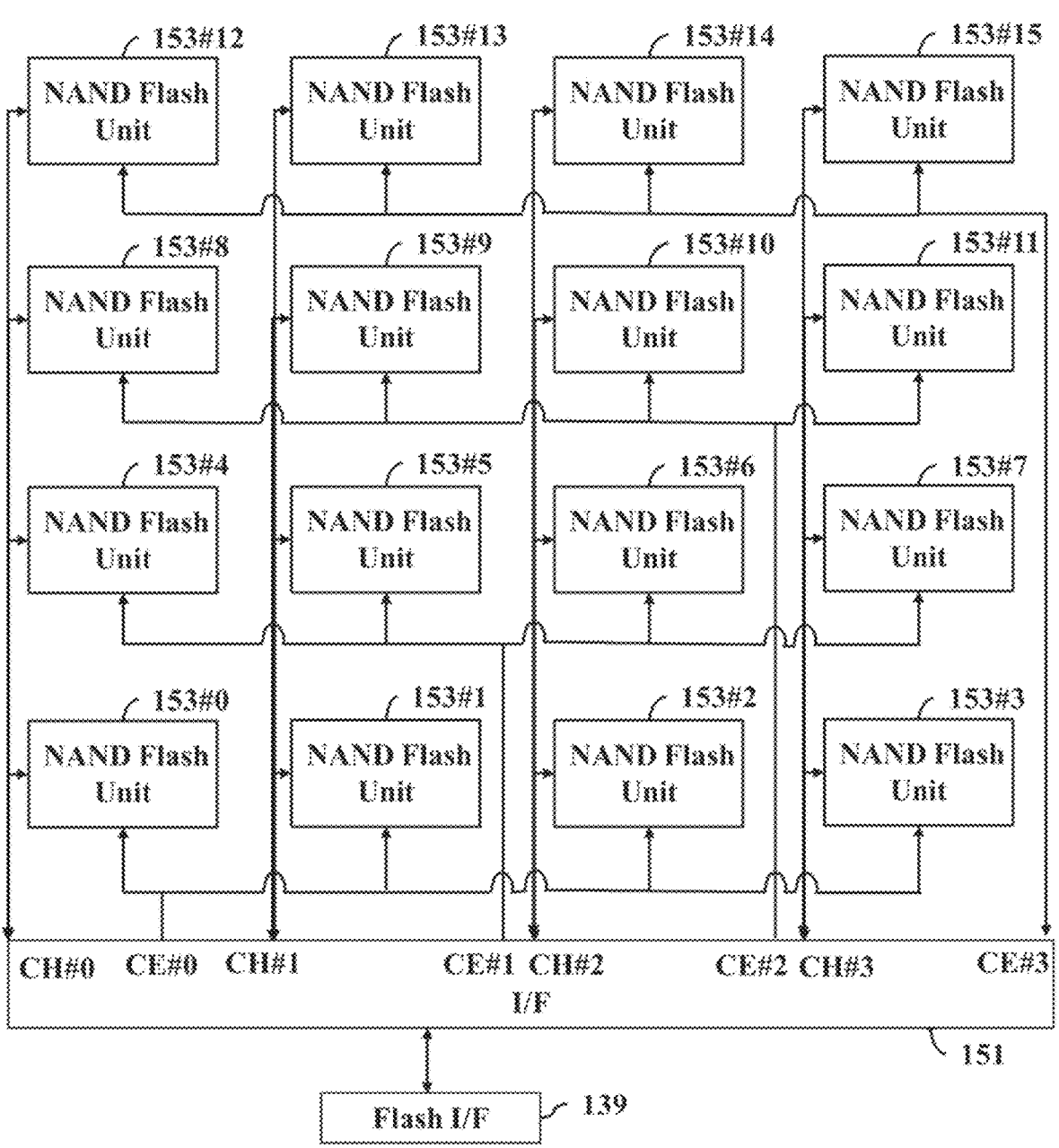
FIG. 2 is a schematic diagram illustrating a flash module according to an embodiment of the present invention.

Refer to FIG. 2. The I/F 151 of the flash module 150 may include four I/O channels (hereinafter referred to as channels) CH #0 to CH #3 and each is connected to four NAND flash units, for example, the channel CH #0 is connected to the NAND flash units 150 #0, 150 #4, 150 #8 and 150 #12. Each NAND flash unit can be packaged in an independent die. The flash I/F 139 may issue one of the CE signals CE #0 to CE #3 through the I/F 151 to activate the NAND flash units 153 #0 to 153 #3, the NAND flash units 153 #4 to 153 #7, the NAND flash units 153 #8 to 153 #11, or the NAND flash units 153 #12 to 153 #15, and read data from or program data into the activated NAND flash units in parallel.

Figure 3:
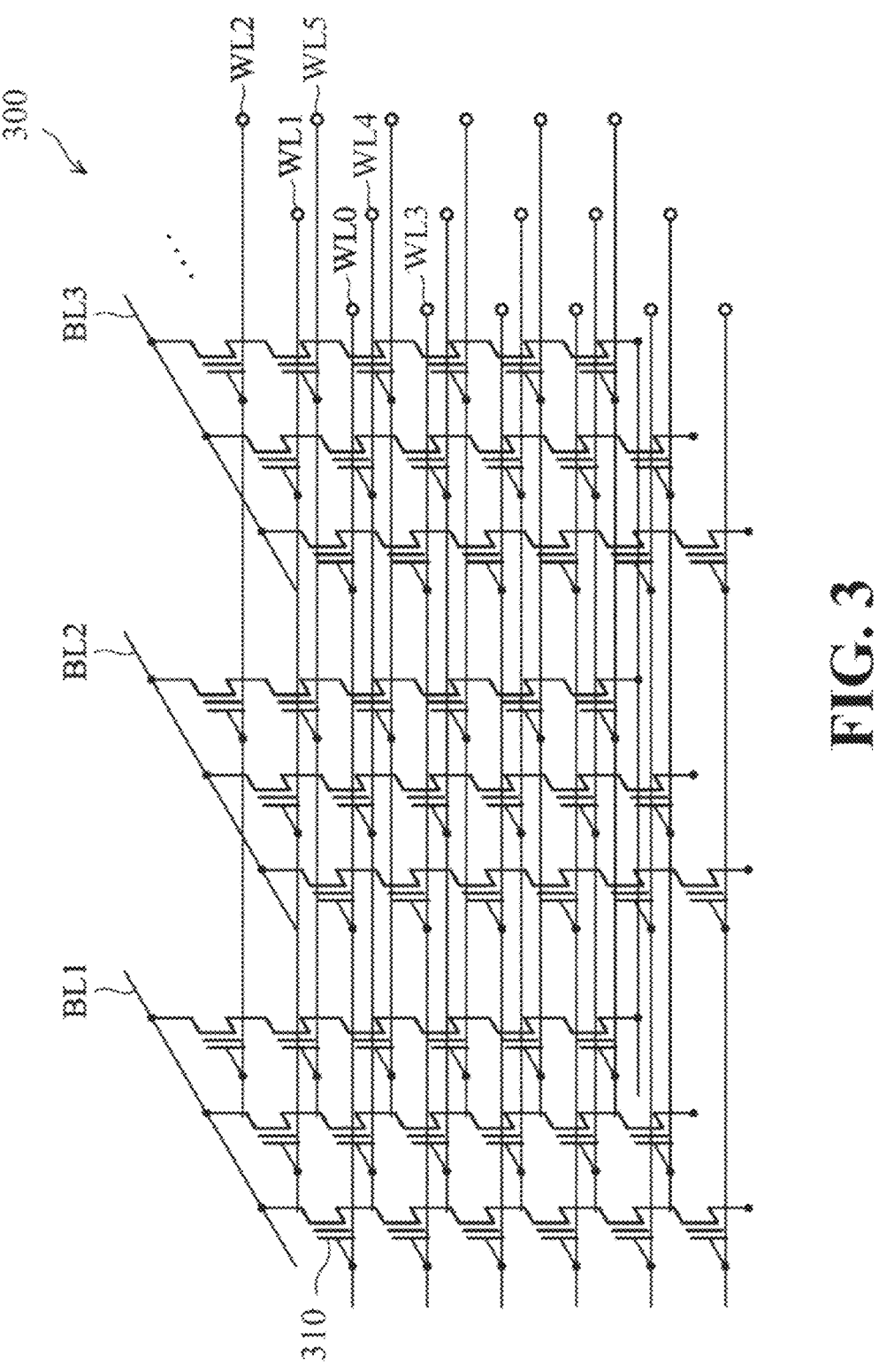
FIG. 3 is a schematic diagram showing the hardware architecture of a portion of a NAND flash unit according to an embodiment of the present invention.

Refer to FIG. 3 showing the hardware architecture of a portion of a NAND flash unit. Each NAND flash unit may contain a plurality of memory blocks (e.g. the memory block 300) and the memory block 300 contains multiple memory cells, such as floating gate transistors (e.g. the floating gate transistor 310), or other charge trap devices. The structure of the memory block 300 includes bit lines and word lines. For brevity, only the bit lines BL1 to BL3 and the word lines WL0 to WL5 are labeled in FIG. 3. For example, the floating gate transistors on each of the word lines WL0 to WL5 form pages for storing data.

The temperature of the device side rises with the intensive executions of I/O commands. Unexpected errors occur during data programming and/or data reading, or even worse, the flash device malfunctions because the temperature of the device side goes too high. For example, the I/O commands include at least one of the following kinds of commands: host read commands, host write commands, etc. received from the host side 110 through the host I/F 131, and device read commands, device write commands, etc. corresponding to a background operation, such as a Garbage Collection (GC) process, a wear leveling process, etc. In order to avoid technical problems caused by the overheated device side, in some embodiments, the processing unit 134 fetches a predetermined number of I/O commands at a time, and pauses the fetching and execution of any I/O command for a predefined time period after the fetched I/O commands have been executed completely. However, if the executions of the I/O commands take a long time due to the large amount of data, the device side may not be able to cool down after the processing unit 134 pauses to fetch and execute any I/O command for the predefined time period. Thus, the temperature of the device side may be go down to an acceptable level after a longer time period for pausing the fetching and execution of any I/O command.

Figure 4:
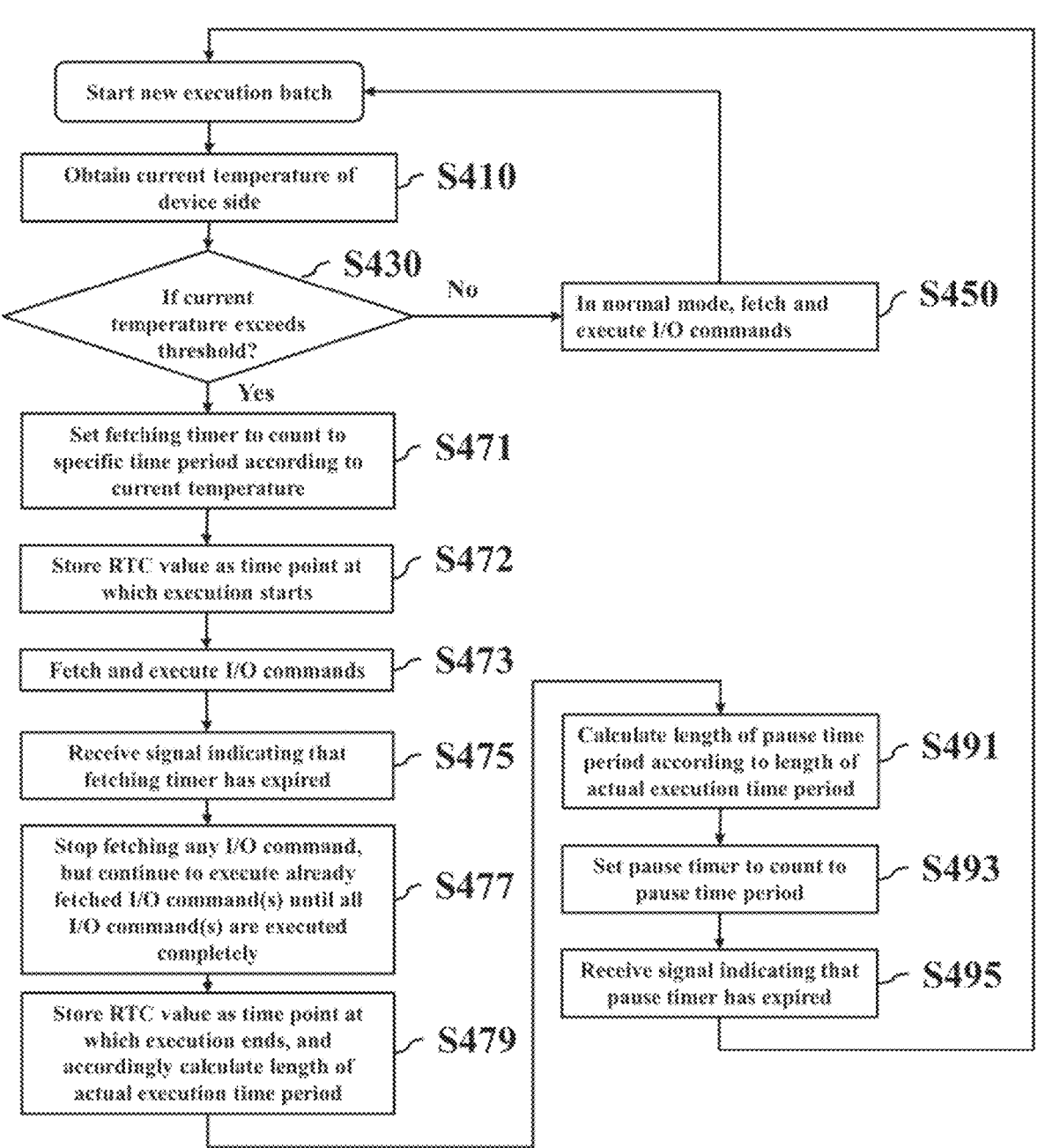
FIG. 4 is a flowchart of a method for controlling executions of input-output (I/O) commands according to an embodiment of the present invention.

In order to solve or alleviate the technical problems caused by the implementations as described above, an embodiment of the present invention introduces a mechanism that the time period for pausing the fetching and execution for any I/O command varies with the time period for executing the fetched I/O commands. Refer to FIG. 4 illustrating the flowchart of the method for controlling executions of I/O commands. The method is performed by the processing unit 134 when loading and executing the program code of the firmware translation layer (FTL). The method fetches and executes I/O commands batch by batch, and the total amount of I/O commands in each batch is not predetermined or fixed. The details are as follows:

Step S410: The current temperature of the device side is obtained. In some embodiments, the temperature sensor 135 is provided in the processing unit 134 for measuring the current temperature of the processing unit 134. The current temperature of the processing unit 134 is considered as the temperature of the device side. In alternative embodiments, the processing unit 134 issues a command to the flash module 150 to query the current temperature of the flash module 150. The processing unit 134 considers the current temperature of the flash module 150 as the temperature of the device side.

Step S430: It is determined whether the obtained current temperature of the device side exceeds the threshold. If so, it means that the temperature of the device side is overheated, and the process proceeds to step S471 to enter the thermal throttling mode, in which the time period for executing the fetched I/O commands and the time period for pausing the fetching and executing any I/O command are adjusted according to the obtained current temperature of the device side, so as to attempt to cool down the temperature of the device side or prevent the temperature of the device side from going higher. Otherwise, the process proceeds to step S450 to enter the normal mode. In some embodiments, the threshold is set to a temperature value of 80 degree Celsius or higher.

Regardless of whether the process is in the thermal throttling mode or the normal mode, designated space of the RAM 136 is allocated for a command queue for storing hundreds or thousands of I/O commands sequentially.

Step S450: In the normal mode, without considering the current temperature of the device side, a preset number of I/O commands are fetched from the command queue in the RAM 136, or I/O commands are fetched from the command queue in the RAM 136 for a predetermined time period, and then are executed sequentially. The processing unit 134 applies a known scheduling algorithm to fetch qualified I/O commands from the command queue, and does not necessarily to fetch I/O commands from the command queue strictly based on the order that I/O commands are generated in time.

For the thermal throttling mode, designated space of the RAM 136 is allocated for a temperature compensation table containing multiple records. Each record stores parameters corresponding to a temperature range. The temperature compensation table is used to obtain or calculate a fetching time period during which I/O commands are fetched to execute, and a pause time period during which any I/O command fetching is stopped. An exemplary temperature compensation table is provided below:

TABLE 1

| Status | Temperature Range (° C.) | Pause Ratio | Preset Fetching Time Period (ms) | Shortest Pause Time Period (ms) | Longest Pause Time Period (ms) |
|---|---|---|---|---|---|
| MT1 | >=81&& <83 | 1 | 10 | 10 | 50 |
| MT2 | >=83&& <85 | 19 | 10 | 190 | 500 |
| MT3 | >=85 | 39 | 5 | 195 | 2000 |

For example, the records of Table 1 enclose the following information: The device side is determined under the status "MT1" when the current temperature of the device side is higher than or equal to 81° C. and is lower than 83° C. The device side is determined under the status "MT2" when the current temperature of the device side is higher than or equal to 83° C. and is lower than 85° C. The device side is determined under the status "MT3" when the current temperature of the device side is higher than or equal to 85° C. In the status "MT1", the pause ratio is set to 1, the preset fetching time period is set to 10 milliseconds (ms), the shortest pause time period is set to 10 ms and the longest pause time period is set to 50 ms. In the status "MT2", the pause ratio is set to 19, the preset fetching time period is set to 10 ms, the shortest pause time period is set to 190 ms and the longest pause time period is set to 500 ms. In the status "MT3", the pause ratio is set to 39, the preset fetching time period is set to 5 ms, the shortest pause time period is set to 195 ms and the longest pause time period is set to 2000 ms.

Step S471: A fetching timer is set to count to a time period according to the obtained current temperature of the device side. The fetching timer is used to limit the time interval during which I/O commands are fetched from the command queue in the RAM 136. For example, refer to Table 1. The FTL determines that the current temperature of the device side matches the record including the status "MT1" in the temperature compensation table, obtains the preset fetching time period being 10 ms from the matched record, and sets the fetching timer to count to 10 ms when the current temperature of the device side is 82.1° C. The FTL determines that the current temperature of the device side matches the record including the status "MT3" in the temperature compensation table, obtains the preset fetching time period being 5 ms from the matched record, and sets the fetching timer to count to 5 ms when the current temperature of the device side is 87° C. The fetching timer sends a signal indicating that the fetching timer has expired when the fetching timer has counted to the set time period.

Step S472: The real-time clock (RTC) value is stored in the RAM 136 as the time point at which execution starts.

Step S473: The I/O commands are fetched from the command queue in the RAM 136, and then, executed. The processing unit 134 applies a known scheduling algorithm to fetch qualified I/O commands from the command queue, and does not necessarily to fetch I/O commands from the command queue strictly based on the order that I/O commands are generated in time.

Step S475: The signal indicating that the fetching timer has expired is received from the fetching timer.

Step S477: The FTL stops fetching any I/O command from the command queue in the RAM 136, but continues to execute the already fetched I/O command(s) until all I/O command(s) are executed completely.

Step S479: The RTC value is stored in the RAM 136 as the time point at which execution ends, and the length of the actual execution time period (for example, in ms as the basic unit) is calculation based on the time points at which execution starts and ends. The actual execution time period of the I/O commands indicates a time interval starting from setting the fetching timer until executions of the I/O commands are completed.

Step S491: The length of the pause time period is calculated according to the length of the actual execution time period. The longer the actual execution time period, the longer the calculated length of the pause time period. In some embodiments, the processing unit 134 uses a mathematical equation to calculate the length of the pause time period according to the length of the actual execution time period. In alternative embodiments, the processing unit 134 calculates the length of the pause time period according to the length of the actual execution time period and the content of the matched record in the temperature compensation table (as shown in Table 1). The processing unit 134 obtains the record matching the current temperature of the device side from the temperature compensation table in the RAM 136, and obtains the pause ratio, the shortest pause time period and the longest pause time period from the matched record. The length of the pause time period is calculated by using the exemplary equation as follows:

$$TS = \min(\max[RT * \text{Ratio}, \text{MIN\_TS}], \text{MAX\_TS})$$

TS represents the length of the pause time period, min( ) represents the function for obtaining the minimum value from the multiple values in the round brackets, max[ ] represents the function for obtaining the maximum value from the multiple values in the square brackets, RT represents the length of the actual execution time period, Ratio represents the pause ratio in the matched record, MIN_TS represents the shortest pause time period in the matched record and MAX_TS represents the longest pause time period in the matched record.

Step S493: The pause timer is set to count to the pause time period calculated in step S491. The pause timer is used to limit the time interval during which I/O commands are not fetched to execute. The pause timer sends a signal indicating that the pause timer has expired when the pause timer has counted to the set time period.

Step S495: The signal indicating that the pause timer has expired is received from the pause timer.

After receiving the signal indicating that the pause timer has expired, the processing unit 134 starts a new execution batch. That is, during the counting period of the pause timer, the device side does not fetch and execute the I/O commands in the command queue of the RAM 136 to allow the temperature of the device side to drop.

In steps S450, S473 and S477, for example, the processing unit 134 performs the following operations: In order to execute the host read command, the processing unit 134 obtains a logical address carried in the host read command, obtains a physical address mapped by this logical address from the H2F table, drives the flash I/F 139 to read user data of this logical address from this physical address of the flash module 150, and drives the host I/F 131 to reply to the host side 110 with the user data of this logical address. In order to execute the device read command, the processing unit 134 obtains a logical address carried in the device read command, obtains a physical address mapped by this logical address from the H2F table, drives the flash I/F 139 to read user data of this logical address from this physical address of the flash module 150, and stores the user data of this logical address in the RAM 136. In order to execute the host write command, the processing unit 134 obtains a logical address carried in the host write command, and user data to be written through the host I/F 131, drives the flash I/F 139 to program user data of this logical address into a physical address of the flash module 150, and updates the F2H table and the H2F table according to the mapping relationship between this logical address and this physical address. In order to execute the device write command, the processing unit 134 obtains user data of a logical address from a designated address of the RAM 136, drives the flash I/F 139 to program user data of this logical address into a physical address of the flash module 150, and updates the F2H table and the H2F table according to the mapping relationship between this logical address and this physical address.

Although the invention is illustrated and described herein with reference to specific embodiments, the invention is not intended to be limited to the details shown. Rather, various modifications may be made in the details within the scope and range of equivalents of the claims and without departing from the invention. It is to be understood that the above description is illustrative of the invention and is not to be construed as limiting the invention. Various modifications, applications and/or combinations of the embodiments may occur to those skilled in the art without departing from the scope of the invention as defined by the claims.

One having ordinary skill in the art will readily understand that the invention as discussed above may be practiced with hardware elements in configurations which are different than those which are disclosed. Therefore, although the invention has been described based upon these preferred embodiments, it would be apparent to those skilled in the art that certain modifications, variations, and alternative constructions would be apparent, while remaining within the scope of the invention.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

The term "device" or "module" is not limited to one or a specific number of physical objects (such as one smartphone, one controller, one processing system and so on). As used herein, a device may be any electronic device with one or more parts that may implement at least some portions of the invention in this disclosure. While the description and examples use the term "device" or "module" to describe various aspects of this disclosure, the term "device" or "module" is not limited to a specific configuration, type, or number of objects. Additionally, the term "system" or "module" is not limited to multiple components or specific aspects. For example, a system may be implemented on one or more printed circuit boards or other substrates and may have movable or static components. While the description and examples use the term "system" to describe various aspects of the invention in this disclosure, the term "system" is not limited to a specific configuration, type, or number of objects.

Specific details are provided in the description above to provide a thorough understanding of the aspects and examples provided herein. However, it will be understood by one of ordinary skills in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Some or all of the aforementioned embodiments of the method of the invention may be implemented in a computer program such as a driver for a dedicated hardware, a Firmware Translation Layer (FTL) of a storage device, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier, or may be located in a network server accessible via a network such as the Internet, or any other suitable carrier.

A computer-readable storage medium includes volatile and non-volatile, removable and non-removable media implemented in any method or technology for storage of information such as computer-readable instruction, data structures, program modules, or other data. A computer-readable storage medium includes, but is not limited to, RAM, ROM, EEPROM, flash memory or other memory, CD-ROM, digital versatile disks (DVD), Blue-ray disk or other optical storage, magnetic cassettes, magnetic tape, magnetic disk or other magnetic storage devices, or any other medium which can be used to store the desired information and may be accessed by an instruction execution system. Note that a computer-readable medium can be paper or other suitable medium upon which the program is printed, as the program can be electronically captured via, for instance, optical scanning of the paper or other suitable medium, then compiled, interpreted, or otherwise processed in a suitable manner, if necessary, and then stored in a computer memory.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

Although the embodiment has been described as having specific elements in FIGS. 1-3, it should be noted that additional elements may be included to achieve better performance without departing from the spirit of the invention. Each element of FIGS. 1-3 is composed of various circuitries and arranged to operably perform the aforementioned operations. While the process flows described in FIG. 4 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for controlling executions of input-output (I/O) commands, performed by a processing unit, comprising:

obtaining a current temperature of a device side, wherein the device side comprises a flash controller and a flash module, and the flash controller is coupled to the flash module and comprises the processing unit;

fetching a plurality of I/O commands from a command queue during a fetching time period, and executing the plurality of I/O commands to read user data from the flash module, and/or program user data into the flash module in response to the current temperature of the device side exceeding a threshold;

calculating a length of an actual execution time period for the plurality of I/O commands, and calculating a length of a pause time period according to the length of the actual execution time period after the plurality of I/O commands are executed completely, wherein a calculated length of the pause time period is limited to a range of a shortest pause time period and a longest pause time period and is positively correlated with the length of the actual execution time period; and not fetching and executing any I/O command in the command queue during the pause time period.

2. The method of claim 1, wherein the processing unit comprises a temperature sensor, and the temperature sensor is arranged operably to: measure a current temperature of the processing unit as the current temperature of the device side.

3. The method of claim 1, comprising:

querying the flash module through a flash interface (I/F) to obtain a current temperature of the flash module as the current temperature of the device side.

4. The method of claim 1, comprising:

providing a temperature compensation table comprising a plurality of records, wherein each record comprises a temperature range, and information about a preset fetching time period corresponding to the temperature range;

obtaining a record matching the current temperature of the device side from the temperature compensation table;

obtaining a length of the preset fetching time period from the matched record;

setting a fetching timer to count to the fetching time period according to the length of the preset fetching time period; and stopping fetching any I/O command from the command queue in response to a signal indicating that the fetching timer has expired, which is received from the fetching timer.

5. The method of claim 4, wherein the actual execution time period of the plurality of I/O commands indicates a time interval starting from setting the fetching timer until executions of the plurality of I/O commands complete.

6. The method of claim 1, wherein the length of the pause time period is calculated by an equation:

$$TS = \min(\max[RT * \text{Ratio}, \text{MIN\_TS}], \text{MAX\_TS}),$$

TS represents the length of the pause time period, min( ) represents a function for obtaining a minimum value from multiple values in round brackets, max[ ] represents a function for obtaining a maximum value from multiple values in square brackets, RT represents the length of the actual execution time period, Ratio represents a pause ratio, MIN_TS represents the shortest pause time period and MAX_TS represents the longest pause time period.

7. The method of claim 6, comprising:

providing a temperature compensation table comprising a plurality of records, wherein each record comprises a temperature range, and a pause ratio, a shortest pause time period and a longest pause time period corresponding to the temperature range;

obtaining a record matching the current temperature of the device side from the temperature compensation table; and obtaining the pause ratio, the shortest pause time period and the longest pause time period of the equation from the matched record.

8. A non-transitory computer-readable storage medium having stored therein program code that, when loaded and executed by a processing unit, causes the processing unit to:

obtain a current temperature of a device side, wherein the device side comprises a flash controller and a flash module, and the flash controller is coupled to the flash module and comprises the processing unit;

fetch a plurality of I/O commands from a command queue during a fetching time period, and execute the plurality of I/O commands to read user data from the flash module, and/or program user data into the flash module in response to the current temperature of the device side exceeding a threshold;

calculate a length of an actual execution time period for the plurality of I/O commands, and calculate a length of a pause time period according to the length of the actual execution time period after the plurality of I/O commands are executed completely, wherein a calculated length of the pause time period is limited to a range of a shortest pause time period and a longest pause time period and is positively correlated with the length of the actual execution time period; and not fetch and execute any I/O command in the command queue during the pause time period.

9. The non-transitory computer-readable storage medium of claim 8, wherein the processing unit comprises a temperature sensor, and the temperature sensor is arranged operably to: measure a current temperature of the processing unit as the current temperature of the device side.

10. The non-transitory computer-readable storage medium of claim 8, wherein the program code that, when loaded and executed by the processing unit, causes the processing unit to:

query the flash module through a flash interface (I/F) to obtain a current temperature of the flash module as the current temperature of the device side.

11. The non-transitory computer-readable storage medium of claim 8, wherein the program code that, when loaded and executed by the processing unit, causes the processing unit to:

provide a temperature compensation table comprising a plurality of records, wherein each record comprises a temperature range, and information about a preset fetching time period corresponding to the temperature range;

obtain a record matching the current temperature of the device side from the temperature compensation table;

obtain a length of the preset fetching time period from the matched record;

set a fetching timer to count to the fetching time period according to the length of the preset fetching time period; and stop fetching any I/O command from the command queue in response to a signal indicating that the fetching timer has expired, which is received from the fetching timer, wherein the actual execution time period of the plurality of I/O commands indicates a time interval starting from setting the fetching timer until executions of the plurality of I/O commands complete.

12. The non-transitory computer-readable storage medium of claim 11, wherein the program code that, when loaded and executed by the processing unit, causes the processing unit to:

provide a temperature compensation table comprising a plurality of records, wherein each record comprises a temperature range, and a pause ratio, a shortest pause time period and a longest pause time period corresponding to the temperature range;

obtain a record matching the current temperature of the device side from the temperature compensation table; and obtain the pause ratio, the shortest pause time period and the longest pause time period of the equation from the matched record.

13. The non-transitory computer-readable storage medium of claim 8, wherein the length of the pause time period is calculated by an equation:

$$TS = \min(\max[RT * \text{Ratio}, \text{MIN\_TS}], \text{MAX\_TS}),$$

TS represents the length of the pause time period, min( ) represents a function for obtaining a minimum value from multiple values in round brackets, max[ ] represents a function for obtaining a maximum value from multiple values in square brackets, RT represents the length of the actual execution time period, Ratio represents a pause ratio, MIN\_TS represents the shortest pause time period and MAX\_TS represents the longest pause time period.

14. An apparatus for controlling executions of input-output (I/O) commands, comprising:

a flash interface (I/F), coupled to a flash module; and a processing unit, coupled to the flash I/F, arranged operably to: obtain a current temperature of a device side, wherein the device side comprises a flash controller and the flash module, and the flash controller is coupled to the flash module and comprises the processing unit and flash I/F; fetch a plurality of I/O commands from a command queue during a fetching time period, and execute the plurality of I/O commands to read user data from the flash module, and/or program user data into the flash module through the flash I/F in response to the current temperature of the device side exceeding a threshold; calculate a length of an actual execution time period for the plurality of I/O commands, and calculate a length of a pause time period according to the length of the actual execution time period after the plurality of I/O commands are executed completely, wherein a calculated length of the pause time period is limited to a range of a shortest pause time period and a longest pause time period and is positively correlated with the length of the actual execution time period; and not fetch and execute any I/O command in the command queue during the pause time period.

15. The apparatus of claim 14, wherein the processing unit comprises a temperature sensor, and the temperature sensor is arranged operably to: measure a current temperature of the processing unit as the current temperature of the device side.

16. The apparatus of claim 14, wherein the processing unit is arranged operably to: query the flash module through the flash I/F to obtain a current temperature of the flash module as the current temperature of the device side.

17. The apparatus of claim 14, comprises:

a random access memory (RAM), arranged operably to: store a temperature compensation table comprising a plurality of records, wherein each record comprises a temperature range, and information about a preset fetching time period corresponding to the temperature range, wherein the processing unit is arranged operably to: obtain a record matching the current temperature of the device side from the temperature compensation table; obtain a length of the preset fetching time period from the matched record; set a fetching timer to count to the fetching time period according to the length of the preset fetching time period; and stop fetching any I/O command from the command queue in response to a signal indicating that the fetching timer has expired, which is received from the fetching timer.

18. The apparatus of claim 17, wherein the actual execution time period of the plurality of I/O commands indicates a time interval starting from setting the fetching timer until executions of the plurality of I/O commands complete.

19. The apparatus of claim 14, wherein the length of the pause time period is calculated by an equation:

$$TS = \min(\max[RT * \text{Ratio}, \text{MIN\_TS}], \text{MAX\_TS}),$$

TS represents the length of the pause time period, min( ) represents a function for obtaining a minimum value from multiple values in round brackets, max[ ] represents a function for obtaining a maximum value from multiple values in square brackets, RT represents the length of the actual execution time period, Ratio represents a pause ratio, MIN_TS represents the shortest pause time period and MAX_TS represents the longest pause time period.

20. The apparatus of claim 19, comprises:

a random access memory (RAM), arranged operably to: store a temperature compensation table comprising a plurality of records, wherein each record comprises a temperature range, and a pause ratio, a shortest pause time period and a longest pause time period corresponding to the temperature range, wherein the processing unit is arranged operably to: obtain a record matching the current temperature of the device side from the temperature compensation table; and obtain the pause ratio, the shortest pause time period and the longest pause time period of the equation from the matched record.

\* \* \* \* \*